(12) United States Patent
Yonekura

(10) Patent No.: US 9,766,994 B2
(45) Date of Patent: Sep. 19, 2017

(54) MONITORING DEVICE WITH FUNCTION OF EXTRACTING AND DISPLAYING BRANCH CIRCUIT IN LADDER PROGRAM

(71) Applicant: FANUC Corporation, Yamanashi (JP)

(72) Inventor: Hiroyuki Yonekura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/067,183

(22) Filed: Mar. 11, 2016

(65) Prior Publication Data

US 2016/0267001 A1    Sep. 15, 2016

(30) Foreign Application Priority Data

Mar. 13, 2015 (JP) .................................. 2015-050570

(51) Int. Cl.
  *G06F 9/44* (2006.01)
  *G06F 11/30* (2006.01)
  *G05B 19/05* (2006.01)

(52) U.S. Cl.
  CPC ............ G06F 11/30 (2013.01); G05B 19/056 (2013.01); *G05B 2219/13052* (2013.01); *Y02P 90/265* (2015.11)

(58) Field of Classification Search
  CPC ......................................................... G06F 9/44
  USPC ................................................. 717/124–135
  See application file for complete search history.

(56) References Cited

U.S. PATENT DOCUMENTS

| 3,961,200 A | * | 6/1976 | Dute | ...................... | G05B 19/07 |
| | | | | | 307/112 |
| 5,109,428 A | * | 4/1992 | Igaki | .................... | A61B 5/1172 |
| | | | | | 356/71 |
| 5,471,597 A | * | 11/1995 | Byers | .................. | G06F 9/30058 |
| | | | | | 711/215 |
| 5,511,198 A | * | 4/1996 | Hotta | ...................... | G06F 8/445 |
| | | | | | 717/146 |
| 5,553,297 A | * | 9/1996 | Yonezawa | ............ | G05B 19/052 |
| | | | | | 700/18 |
| 5,675,645 A | * | 10/1997 | Schwartz | .............. | G06F 21/123 |
| | | | | | 705/57 |

(Continued)

FOREIGN PATENT DOCUMENTS

JP    2-123605 U    10/1990
JP    3-108005 A    5/1991

(Continued)

OTHER PUBLICATIONS

Decision to Grant a Patent in JP Patent Application No. 2015-050570, mailed Mar. 7, 2017.

*Primary Examiner* — Jae Jeon
(74) *Attorney, Agent, or Firm* — Hauptman Ham, LLP

(57) ABSTRACT

When a monitoring device for ladder program receives designation of a ladder program which is a confirmation object from a user, the monitoring device detects a branch circuit which is arranged above the ladder circuit which is the confirmation object in a ladder program and is closest to the ladder circuit and extracts a branch circuit which is to be a display object from the ladder program based on a type of the branch circuit which is detected. The monitoring device executes such processing up to a head of the ladder program so as to extract and display branch circuits up to the ladder circuit which is the confirmation object.

3 Claims, 10 Drawing Sheets

(56) References Cited

U.S. PATENT DOCUMENTS

| | | | | |
|---|---|---|---|---|
| 5,742,624 A | * | 4/1998 | Irie | G05B 19/058 |
| | | | | 714/799 |
| 6,006,033 A | * | 12/1999 | Heisch | G06F 8/445 |
| | | | | 711/125 |
| 2004/0181293 A1 | | 9/2004 | Tanizawa et al. | |

FOREIGN PATENT DOCUMENTS

| | | |
|---|---|---|
| JP | 4-286001 A | 10/1992 |
| JP | 4-370806 A | 12/1992 |
| JP | 6-134718 A | 6/1993 |
| JP | 2001-67122 A | 3/2001 |
| JP | 2003-84813 A | 3/2003 |
| JP | 2004-268435 A | 9/2004 |
| JP | 2008-204254 A | 9/2008 |
| JP | 2009-9314 A | 1/2009 |
| JP | 2009-122936 A | 6/2009 |

\* cited by examiner

FIG.4

LADDER CIRCUIT ON CURSOR POSITION

| 106TH NET (WRT R-MEM) |

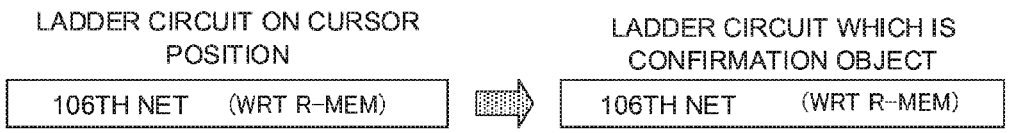

LADDER CIRCUIT WHICH IS CONFIRMATION OBJECT

| 106TH NET (WRT R-MEM) |

FIG.5

LADDER CIRCUIT WHICH IS CONFIRMATION OBJECT

| 106TH NET (WRT R-MEM) |

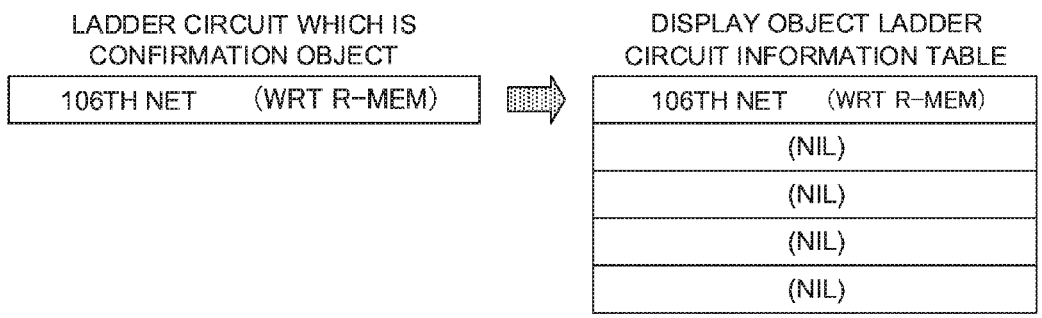

DISPLAY OBJECT LADDER CIRCUIT INFORMATION TABLE

| 106TH NET (WRT R-MEM) |
| (NIL) |
| (NIL) |
| (NIL) |
| (NIL) |

FIG.6

BRANCH CIRCUIT INFORMATION TABLE

| 10TH NET | (JUMP L1) |
| 15TH NET | (LABEL L1) |
| 20TH NET | (JUMP L2) |
| 30TH NET | (CALL P1) |
| 50TH NET | (LABEL L2) |
| 104TH NET | (SP P1) |
| 120TH NET | (JUMP L3) |
| 125TH NET | (LABEL L3) |
| 130TH NET | (SPE) |

FIG.7

BRANCH CIRCUIT INFORMATION TABLE

| 10TH NET | (JUMP L1) |
| 15TH NET | (LABEL L1) |
| 20TH NET | (JUMP L2) |
| 30TH NET | (CALL P1) |
| 50TH NET | (LABEL L2) |
| 104TH NET | (SP P1) |
| 120TH NET | (JUMP L3) |
| 125TH NET | (LABEL L3) |
| 130TH NET | (SPE) |

LADDER CIRCUIT WHICH IS CONFIRMATION OBJECT

| 106TH NET | (WRT R-MEM) |

FIG.8

BRANCH CIRCUIT INFORMATION TABLE

| 10TH NET | (JUMP L1) |
| 15TH NET | (LABEL L1) |
| 20TH NET | (JUMP L2) |
| 30TH NET | (CALL P1) |
| 50TH NET | (LABEL L2) |
| 104TH NET | (SP P1) |
| 120TH NET | (JUMP L3) |
| 125TH NET | (LABEL L3) |
| 130TH NET | (SPE) |

DISPLAY OBJECT LADDER CIRCUIT INFORMATION TABLE

| 30TH NET | (CALL P1) |
| 104TH NET | (SP P1) |
| 106TH NET | (WRT R-MEM) |
| 130TH NET | (SPE) |
| (NIL) | |
| (NIL) | |
| (NIL) | |
| (NIL) | |
| (NIL) | |

LADDER CIRCUIT WHICH IS CONFIRMATION OBJECT

| 30TH NET | (CALL P1) |

FIG.9

BRANCH CIRCUIT INFORMATION TABLE

| 10TH NET | (JUMP L1) |
| 15TH NET | (LABEL L1) |
| 20TH NET | (JUMP L2) |
| 30TH NET | (CALL P1) |
| 50TH NET | (LABEL L2) |
| 104TH NET | (SP P1) |
| 120TH NET | (JUMP L3) |
| 125TH NET | (LABEL L3) |
| 130TH NET | (SPE) |

LADDER CIRCUIT WHICH IS CONFIRMATION OBJECT

| 30TH NET | (CALL P1) |

FIG.10

BRANCH CIRCUIT INFORMATION TABLE

| 10TH NET | (JUMP L1) |
| 15TH NET | (LABEL L1) |
| 20TH NET | (JUMP L2) |
| 30TH NET | (CALL P1) |
| 50TH NET | (LABEL L2) |
| 104TH NET | (SP P1) |
| 120TH NET | (JUMP L3) |
| 125TH NET | (LABEL L3) |
| 130TH NET | (SPE) |

DISPLAY OBJECT LADDER CIRCUIT INFORMATION TABLE

| 20TH NET | (JUMP L2) |
| 30TH NET | (CALL P1) |
| 50TH NET | (LABEL L2) |
| 104TH NET | (SP P1) |
| 106TH NET | (WRT R-MEM) |
| 130TH NET | (SPE) |
| (NIL) | |
| (NIL) | |
| (NIL) | |

LADDER CIRCUIT WHICH IS CONFIRMATION OBJECT

| 20TH NET | (JUMP L2) |

MONITORING DEVICE WITH FUNCTION OF EXTRACTING AND DISPLAYING BRANCH CIRCUIT IN LADDER PROGRAM

RELATED APPLICATIONS

The present application claims priority to Japanese Patent Application Number 2015-050570, filed Mar. 13, 2015, the disclosure of which is hereby incorporated by reference herein in its entirety.

BACKGROUND OF THE INVENTION

1. Field of the Invention

The present invention relates to a monitoring device for ladder program, and especially relates to a monitoring device for ladder program which is provided with a function of automatically extracting branch circuits led to a certain ladder circuit and collectively displaying the branch circuits.

2. Description of the Related Art

In creation of a ladder program, in verification (debug) of an operation of the ladder program, and in diagnosis of abnormality or the like in an operation, call of a relevant ladder circuit onto a screen from a ladder program is frequently performed. Therefore, a function of detecting and extracting a ladder circuit by using signals and instructions which are used in the target ladder circuit as conditions is often provided.

In general, in a case where a specific ladder circuit is searched from a ladder program, a signal used in the ladder circuit is designated and a ladder circuit in which the designated signal is included is detected so as to extract the target ladder circuit. A signal which is a detecting condition is generally designated by a letter string representing a name (an identifier), an address, and the like which are assigned to the signal. Further, an operator is notified of a result of detection such that a ladder circuit which is first determined to satisfy a condition is displayed on a screen or all ladder circuits which are determined to satisfy the condition are displayed in a list.

On the other hand, in a ladder program, an operation of the program can be branched by a jump instruction or a subroutine call instruction, and in a monitoring device for ladder program, a state of a signal which is a branching condition of a branch circuit representing such jump instruction, subroutine call instruction, and the like can be confirmed.

Further, as a prior art technique of extracting and displaying a ladder circuit, a monitoring device for ladder program which is provided with a function of extracting and displaying a plurality of ladder circuits which use a certain signal is disclosed (refer to Japanese Patent Application Laid-Open No. 5-134718, Japanese Patent Application Laid-Open No. 2003-084813, Japanese Patent Application Laid-Open No. 2008-204254, and Japanese Patent Application Laid-Open No. 2009-122936, for example).

In verification of an operation of a ladder program, when a certain ladder circuit does not operate, that is, when processing is skipped, it is necessary to confirm a branch circuit which represents a jump instruction, a subroutine call instruction, and the like and allows the ladder circuit which does not operate to perform.

In a case where this confirmation operation is performed by using the above-described prior art technique, a user is required to manually detect respective branch circuits which allow a ladder circuit which does not operate to perform in sequence to confirm a branching condition. However, manual detection and confirmation of branch circuits with respect to a large-size ladder program require a great deal of labor and impose a substantial burden on a user.

SUMMARY OF THE INVENTION

An object of the present invention is to provide a monitoring device for ladder circuit which facilitates detection of a cause by which a ladder circuit does not operate.

A monitoring device for ladder program according to the present invention includes a confirmation object ladder circuit information storage region for storing information related to a ladder circuit which is a confirmation object, a display object ladder circuit information table for storing information related to a ladder circuit which is a display object, a confirmation object ladder circuit designation unit which receives designation of a ladder circuit which is a confirmation object in the ladder program from a user and stores information related to the ladder circuit which is designated and is the confirmation object in the confirmation object ladder circuit information storage region and the display object ladder circuit information table, a detection unit which detects, based on the ladder circuit which is the confirmation object and is stored in the confirmation object ladder circuit information storage region, a branch circuit which is arranged above the ladder circuit which is the confirmation object in the ladder program and which is closest to the ladder circuit, an extraction unit which extracts a branch circuit which is to be a display object from the ladder program to add the branch circuit to the display object ladder circuit information table based on a type of the branch circuit which is the closest, and determines a ladder circuit which is to be a next confirmation object to store information related to the ladder circuit which is to be the next confirmation object in the confirmation object ladder circuit information storage region based on information related to the branch circuit which is the closest, and a display unit which displays a ladder circuit which is the display object and is stored in the display object ladder circuit information table, in which processing performed by the detection unit and the extraction unit is repeated until a first branch circuit in terms of positions in the ladder program is set to a confirmation object.

The extraction unit may be configured to (1) add a branch circuit which represents a head of a subprogram, a branch circuit which represents a last of the subprogram, and a branch circuit which represents call of the subprogram to the display object ladder circuit information table and store information related to the branch circuit which represents call of the subprogram in the confirmation object ladder circuit information storage region, in a case where the branch circuit which is the closest is the branch circuit which represents the head of the subprogram, (2) add a branch circuit which represents a jump instruction and a branch circuit which represents a jump destination instructed by the jump instruction to the display object ladder circuit information table and store information related to the branch circuit which represents the jump instruction in the confirmation object ladder circuit information storage region in a case where the branch circuit which is the closest is the branch circuit which represents the jump instruction and the branch circuit which represents the jump instruction instructs a jump to a lower direction than the ladder circuit being confirmation object, in terms of positions in the ladder program, and (3) store a branch circuit which is arranged above the ladder circuit stored in the confirmation object ladder circuit information storage region, in terms of positions in the ladder program, and which is the closest in the confirmation object ladder circuit information storage region in other cases.

The display unit may have a display mode for displaying change of a signal of each contact used in the ladder circuit which is the display object, with respect to time.

According to the present invention, in a case where a certain ladder circuit does not operate (processing is skipped), branch circuits up to the ladder circuits are extracted and displayed and accordingly, a condition required to operate the ladder circuit can be easily found out.

BRIEF DESCRIPTION OF THE DRAWINGS

The above-described and other objects and features of the present invention will be apparent from description of the following embodiments in reference to the accompanying drawings. Among these drawings.

FIG. 4 illustrates processing for storing information related to a ladder circuit which is a confirmation object;

FIG. 5 illustrates processing for storing information related to a ladder circuit which is a display object;

FIG. 6 illustrates a table in which branch circuits included in the ladder program are extracted;

FIG. 7 illustrates processing (1) for detecting a branch circuit closest to a ladder circuit which is a confirmation object;

FIG. 8 illustrates processing (1) for extracting a ladder circuit which is a display object;

FIG. 9 illustrates processing (2) for detecting a branch circuit closest to a ladder circuit which is a confirmation object;

FIG. 10 illustrates processing (2) for extracting a ladder circuit which is a display object;

DETAILED DESCRIPTION OF THE PREFERRED EMBODIMENT

A monitoring device for ladder program according to the present invention provides a function of extracting and displaying a branch circuit of a ladder program through the following procedures.

(1) The monitoring device receives a designation of a ladder circuit which is a confirmation object from a user. When the monitoring device specifies position information, in a ladder program, of the ladder circuit which is the confirmation object, the monitoring device analyzes the ladder program to extract position information of a branch circuit (a jump start, a jump end, a subroutine call, a head of a subroutine, a last of a subroutine, and the like).

(2) Then, based on the extracted position information of the branch circuit, the monitoring device detects a branch circuit which includes the designated ladder circuit which is the confirmation object.

(3) Then, (3-1) in a case where the detected ladder circuit which is the confirmation object is included between a jump start and a jump end, the monitoring device extracts circuits on the jump start and end as display data, while (3-2) in a case where the detected ladder circuit which is the confirmation object is included in a subprogram, the monitoring device extracts circuits on the start and the end of the subprogram and a call circuit of the subprogram as display data.

(4) The monitoring device further performs extraction processing similar to that mentioned above while setting the circuits, which are extracted as the display data through the above-mentioned extraction processing (3), as ladder circuits which are new confirmation objects so as to extract branch circuits as display data.

(5) Thus, the monitoring device repeats extraction processing and collectively displays all circuits which are extracted as display data on a display. Further, the monitoring device collectively diagnoses signal change of contacts, which are used in the circuits extracted as display data, while using the contacts as sampling addresses of a tracing function.

Through the above-mentioned processing (1) to (5), only branch circuits related to an operation of a ladder circuit which is a confirmation object are extracted as display objects from the head of a ladder program to the ladder circuit which is designated by a user and is the confirmation object. Therefore, when the user looks at branch circuits displayed on a screen, the user can easily find out a condition required to allow the ladder circuit which is the confirmation object to operate. As a result, labor is substantially reduced compared to reviewing the whole ladder program.

A monitoring device for ladder program according to an embodiment of the present invention is now described with reference to the accompanying drawings.

Figure 1:
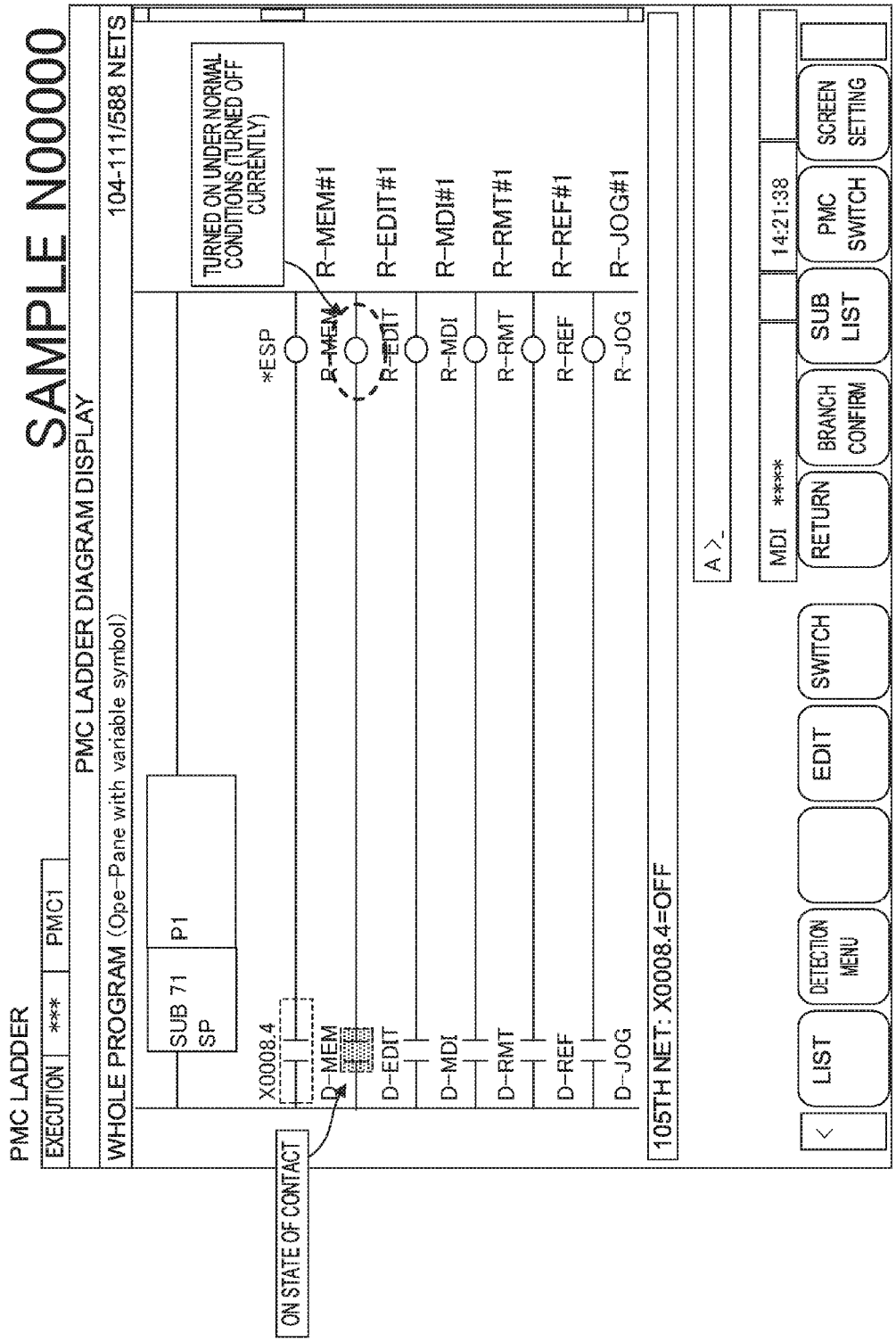
FIG. 1 illustrates an image obtained when a part of a ladder program is displayed on a display screen of a display of a monitoring device according to an embodiment of the present invention.
Figure 2:
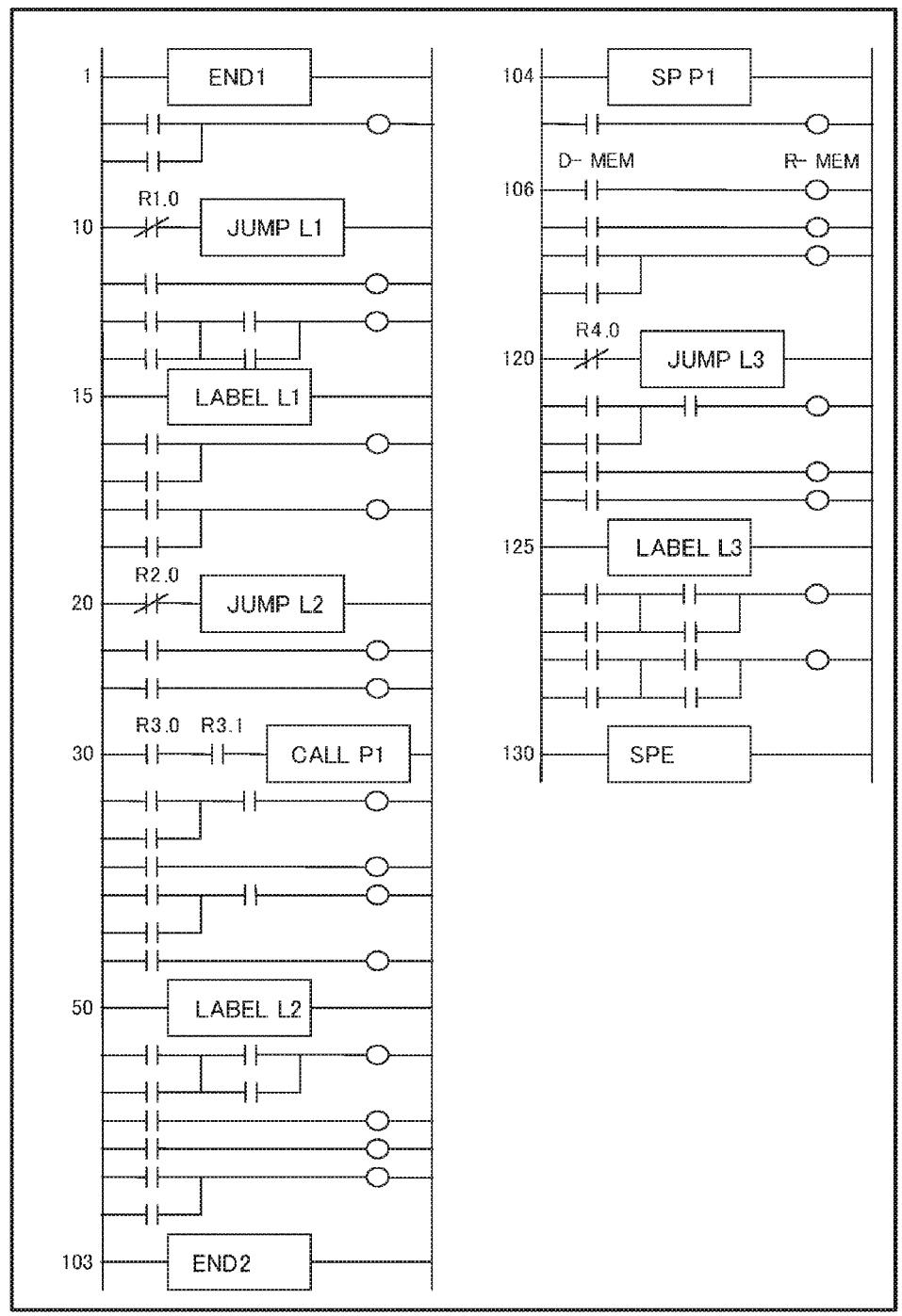
FIG. 2 is a ladder diagram schematically illustrating the ladder program displayed on the display screen of FIG. 1.

FIG. 1 illustrates an image obtained when a part of a ladder program is displayed on a display screen of a display of the monitoring device. FIG. 2 is a ladder diagram schematically illustrating the ladder program illustrated in FIG. 1.

In a case of the ladder diagram displayed on the display screen illustrated in FIG. 1 (the 104th to 111th nets (refer to an upper right part of FIG. 1)), when a contact D-MEM is turned on, a coil R-MEM is also turned on under normal conditions. However, in FIG. 1, even though the contact D-MEM is turned on, the coil R-MEM is not turned on. Here, as a cause by which the coil R-MEM is not turned on, it is conceivable that the corresponding ladder circuit is skipped by a jump instruction or a subprogram call instruction. Therefore, the monitoring device for ladder program facilitates detection of a skipped part by the following procedures.

<Procedure 1: Designation of Ladder Circuit which is Confirmation Object>

Figure 3:
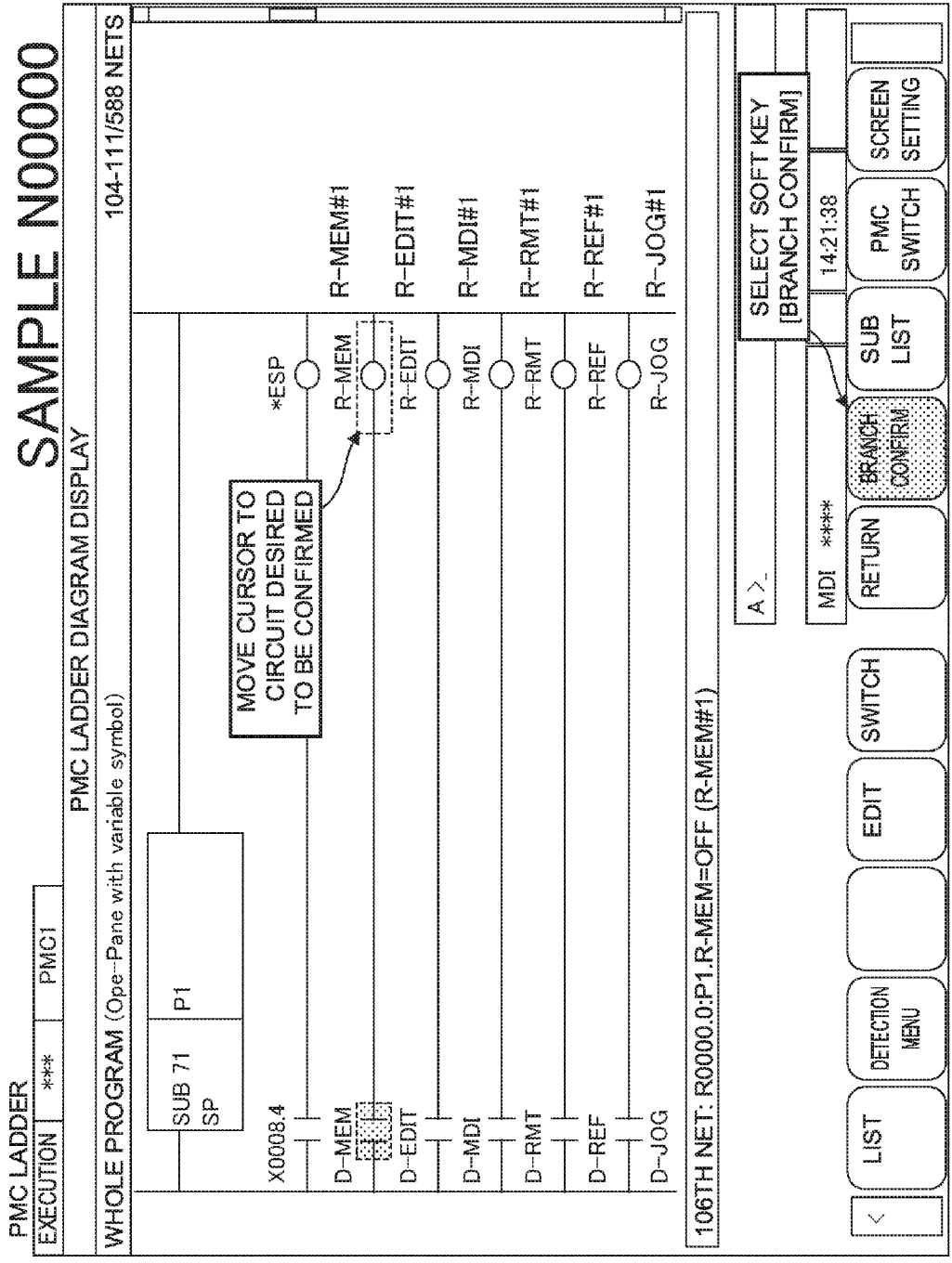
FIG. 3 illustrates an operation, which is performed by a user, for designating a ladder circuit which is a confirmation object on the display screen of FIG. 1.

As illustrated in FIG. 3, a user moves a cursor to a circuit desired to be confirmed on a monitoring screen which displays a ladder program and selects a soft key "BRANCH CONFIRM" through a touch panel or a key operation. Then, the monitoring device for ladder program sets the ladder circuit displayed on a cursor position in a confirmation object ladder circuit information storage region which is provided on a memory as information related to the ladder circuit which is a confirmation object so as to acquire position information, on a ladder program, of the information related to the ladder circuit which is the confirmation object, as illustrated in FIG. 4. Further, the monitoring device for ladder program adds the information related to the ladder circuit which is the confirmation object to a display object ladder circuit information table which is provided on the memory as information related to a ladder circuit which is a display object, as illustrated in FIG. 5. The information related to the ladder circuit which is the confirmation object and the information related to the ladder circuit which is the display object include a net number (line number), a type of a circuit, and a name as illustrated in FIG. 4 and FIG. 5.

<Procedure 2: Analysis of Ladder Program>

In this procedure, the monitoring device for ladder program analyzes a ladder program which is a monitoring object and extracts all branch circuits included in the ladder program so as to produce a branch circuit information table, in which pieces of information related to the extracted branch circuits are registered, on the memory (FIG. 6). Circuits related to branching such as a jump instruction (JUMP), a subprogram call instruction (CALL), a label of a jump destination (LABEL), a head of a subprogram of a call destination (SP), a last of the subprogram (SPE), and the like are extracted as branch circuits. Information related to the extracted branch circuits includes a net number (line number), a type of an instruction, and a name, as illustrated in FIG. 6.

<Procedure 3: Detection of Branch Circuit Information Table>

In this procedure, the monitoring device for ladder program detects the last branch circuit, among branch circuits which are arranged above the ladder circuit which is the confirmation object in the ladder program, from the branch circuit information table (FIG. 6) which is produced in the procedure 2, based on the information which is related to the ladder circuit, which is the confirmation object, and is stored in the confirmation object ladder circuit information storage region in the procedure 1 (FIG. 7). In the example of FIG. 7, the ladder circuit which is the confirmation object is arranged on the 106th net in the ladder program, and the last branch circuit (the closest branch circuit to the 106th net) among branch circuits arranged above the ladder circuit is "SP P1" on the 104th net. The monitoring device for ladder program compares the net number (line number) in information related to the ladder circuit which is the confirmation object with net numbers (line numbers) in pieces of information which are related to respective branch circuits and are registered in the branch circuit information table (FIG. 6) so as to detect a branch circuit closest to the ladder circuit which is the confirmation object in the ladder program.

<Procedure 4: Extraction of Branch Circuit which is Display Object>

In this procedure, a ladder circuit which is a display object is extracted from the branch circuit information table based on a branch circuit which is detected in the procedure 3 so as to register information related to the ladder circuit which is extracted and is a display object in a display object ladder circuit information table. A ladder circuit which is extracted and is a display object varies depending on a type of the branch circuit which is detected in the procedure 3 as described below.

In a case where a branch circuit detected in the procedure 3 is the head of a subprogram (SP), the head and the last of the subprogram and a call source of the subprogram are added to the display object ladder circuit information table as information related to the ladder circuit which is the display object. In an example of FIG. 8, a detected branch circuit is "SP P1" and "SP P1" is the head of a subprogram P1, so that the last (SPE P1) of the subprogram P1 and a call source (CALL P1) of the subprogram P1 are extracted from the branch circuit information table and pieces of information related to these three branch circuits are added to the display object ladder circuit information table as information related to the ladder circuit which is the display object. In this case, the information related to the branch circuit which is the call source of the subprogram is set in the confirmation object ladder circuit information storage region so as to set the branch circuit which is the call source as a ladder circuit which is the next confirmation object.

Here, there is a case where a plurality of branch circuits which are call sources of a subprogram exist. In this case, addition of display objects to the ladder circuit information table, setting to the confirmation object ladder circuit information storage region, and the procedures 3 and 4 which will be described later may be repeatedly performed for respective branch circuits which are call sources of the subprogram. In this case, care may be taken not to add a ladder circuit which is a display object and has already been stored in the ladder circuit information table so as to avoid overlapping.

In a case where a branch circuit detected in the procedure 3 represents a jump instruction (JUMP), a corresponding jump destination is detected from the branch circuit information table. FIG. 9 illustrates an example in which "JUMP L2" on the 20th net is detected from the branch circuit information table in the second round of procedure 3 which is executed along the procedure which has been described thus far ("CALL P1" is registered in the confirmation object ladder circuit information storage region).

Then, in a case where a jump destination of a detected jump circuit is arranged below a position of a ladder circuit which is a confirmation object in the ladder program (or the net number is larger), the jump instruction detected in the procedure 3 and information related to the corresponding jump destination are added to the display object ladder circuit information table as information related to the ladder circuit which is the display object (FIG. 10). In this case, the information related to the branch circuit representing the jump instruction is set in the confirmation object ladder circuit information storage region so as to set the branch circuit representing the jump instruction as a ladder circuit which is the next confirmation object.

On the other hand, in a case where the jump destination of the detected jump circuit is arranged above the position of the ladder circuit which is the confirmation object in the ladder program (or the net number is smaller), information related to a branch circuit representing the jump instruction is set in the confirmation object ladder circuit information storage region without performing addition of a display object so as to set the branch circuit representing the jump instruction as a ladder circuit which is the next confirmation object.

In a case where a branch circuit detected in the procedure 3 representing other than a jump instruction or the head of a subprogram, information related to the branch circuit is set in the confirmation object ladder circuit information storage region without performing addition of a display object so as to set the branch circuit as a ladder circuit which is the next confirmation object.

Then, the procedure 3 and the procedure 4 are repeatedly executed up to the head of the table.

<Procedure 5: Display of Ladder Circuit which is Display Object>

Figure 11:
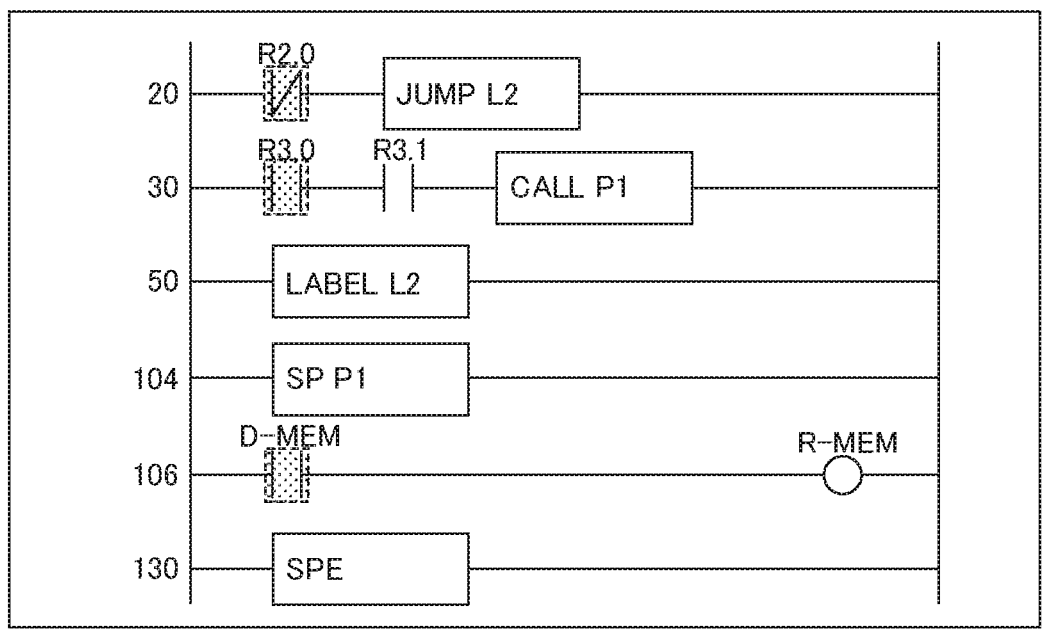
FIG. 11 illustrates a display example of a ladder circuit which is a display object.

In this procedure, a ladder circuit which is a display object and extracted through the procedure 1 to the procedure 4 is displayed on a screen. Further, a contact and the like which are used in the ladder circuit which is displayed are highlighted depending on a signal state. FIG. 11 illustrates an example in which a ladder circuit which is registered in the display object ladder circuit information table as a result of execution of the procedure 1 to the procedure 4 in the above-described example is displayed while highlighting a signal state.

Thus, only branch circuits related to R-MEM which is on the 106th net, that is, branch circuits passed through from the head of the ladder program to the 106th net, and a branch circuit which has possibly skipped the 106th net are displayed. Accordingly, it is easily recognized that R3.1 on the 30th net is tuned off, therefore, a subprogram P1 is not called, and the 106th net is not processed.

Figure 12:
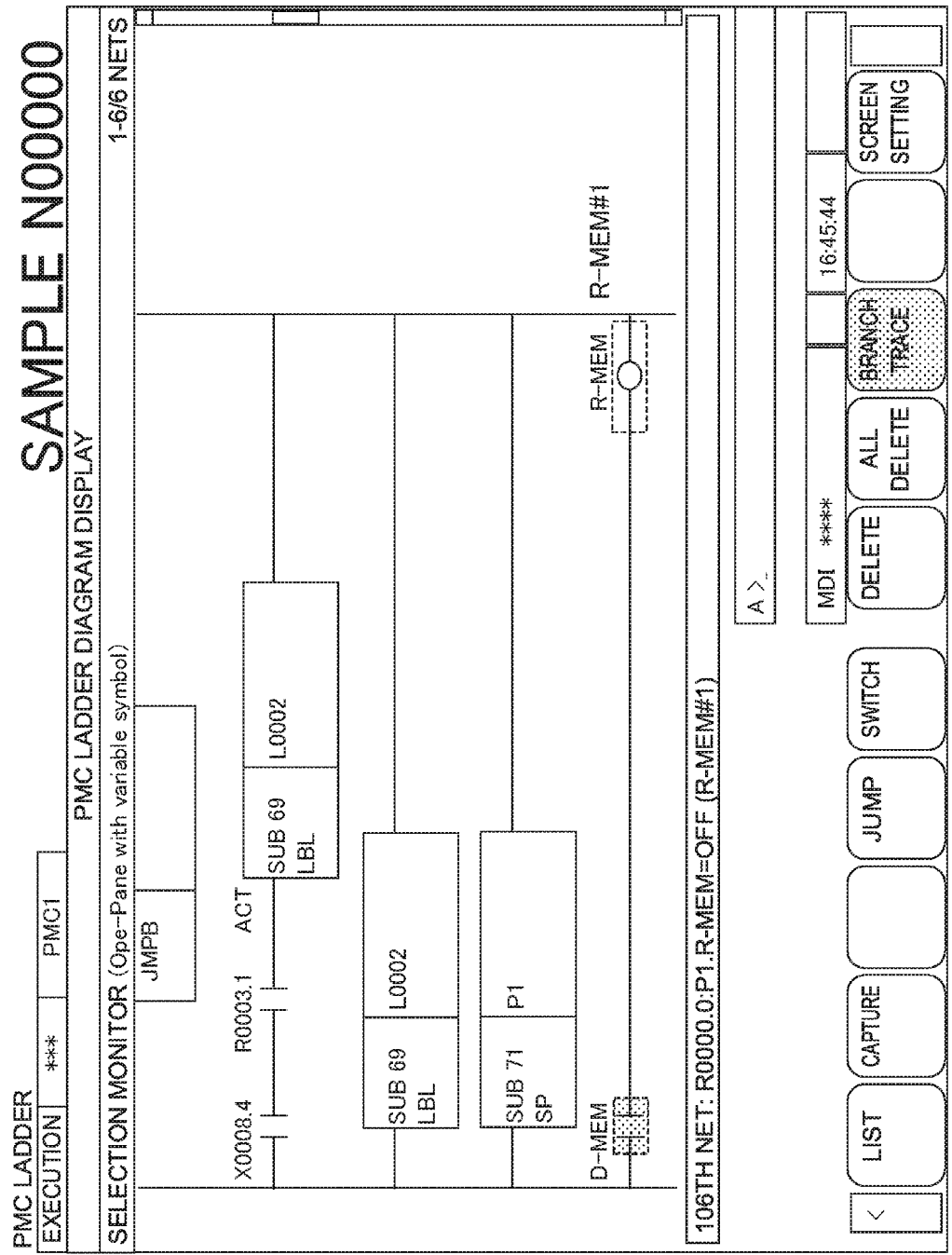
FIG. 12 illustrates an operation for confirming change of dynamic conditions of a branch circuit.
Figure 13:
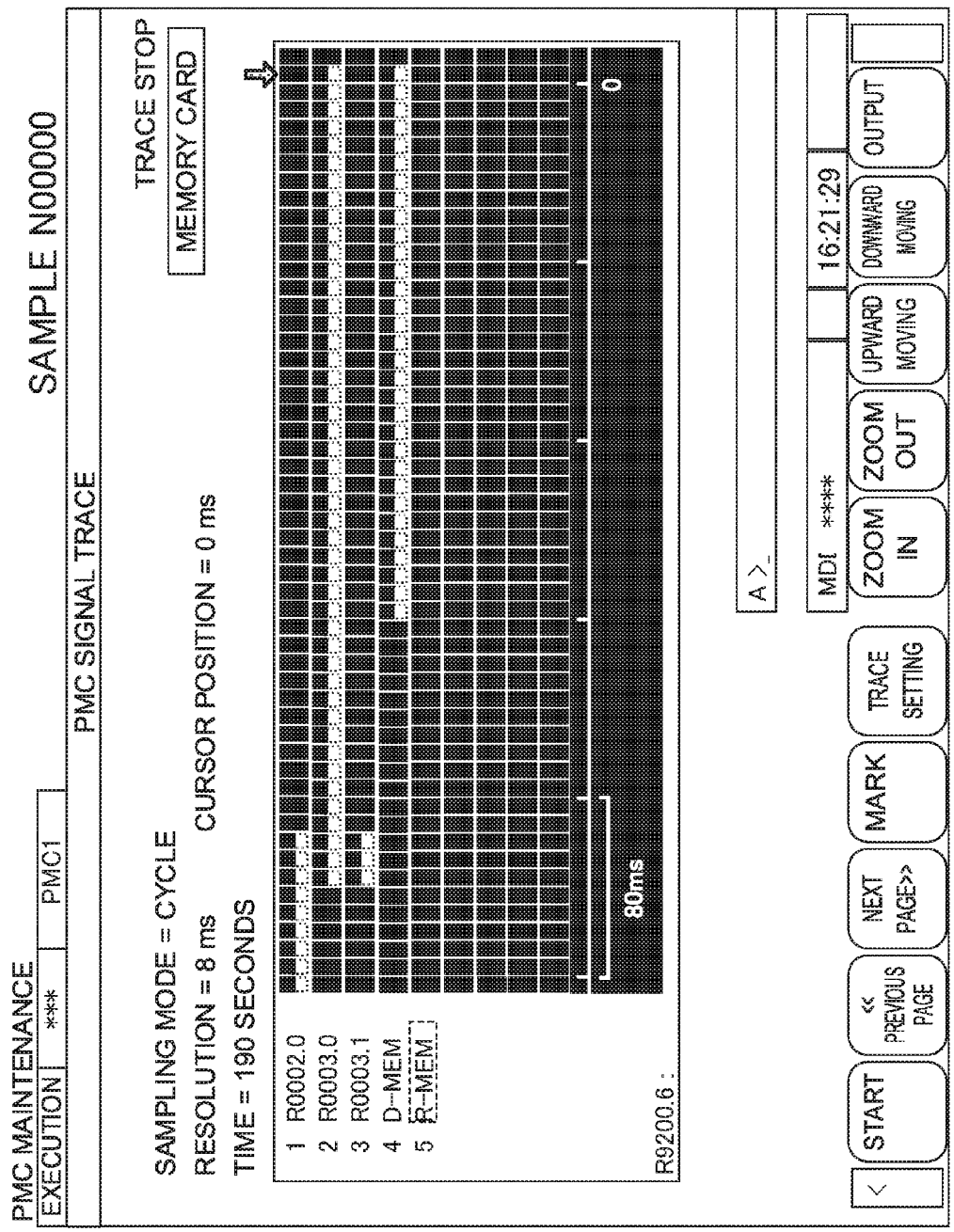
FIG. 13 illustrates an example of a screen for confirming change of a dynamic condition of a branch circuit.

Further, when change of dynamic conditions of a branch circuit is desired to be confirmed, a soft key [BRANCH TRACE] is selected on a screen which displays an extracted ladder circuit (FIG. 12) and consequently, the screen display is switched to a trace screen (FIG. 13). Accordingly, signal change of each contact which is used in the above-mentioned circuit can be grasped, so that conditions and cases which are not established depending on timing can also be easily confirmed.

Figure 14:
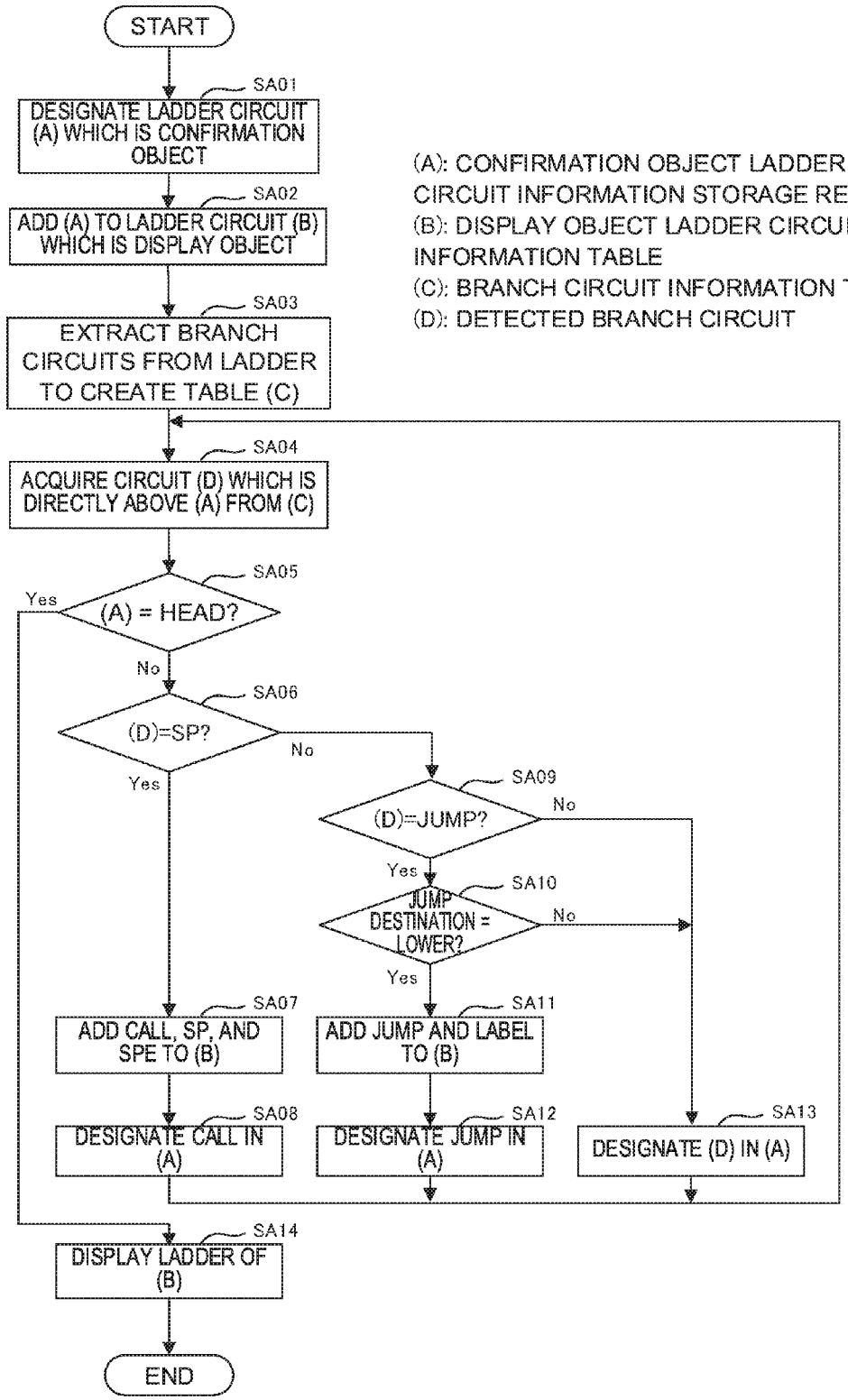
FIG. 14 is a flowchart of processing which is executed by the monitoring device for ladder program according to the embodiment of the present invention.

FIG. 14 is a flowchart of processing which is executed on the monitoring device for ladder program according to the present embodiment.

[Step SA01] Designation of a ladder circuit which is a confirmation object is received from a user and the designated ladder circuit is set in the confirmation object ladder circuit information storage region.

[Step SA02] The ladder circuit which is a confirmation object and is designated in step SA01 is registered in the display object ladder circuit information table.

[Step SA03] A ladder program is analyzed and all branch circuits which are included in the ladder program are extracted to be registered in the branch circuit information table.

[Step SA04] The last branch circuit is detected among branch circuits which are arranged above the position of the ladder circuit, which is set in the confirmation object ladder circuit information storage region, in the ladder program, from the branch circuit information table.

[Step SA05] Whether or not the ladder circuit which is set in the confirmation object ladder circuit information storage region is arranged on the head of the branch circuit information table or whether or not the ladder circuit which is set in the confirmation object ladder circuit information storage region is arranged above a ladder circuit, which is registered in the head of the branch circuit information table, in the ladder program (whether a ladder circuit is not detected in step SA04) is determined. In a case where the determination result is Yes, it is determined that extraction of a ladder circuit which is a display object is ended and the process proceeds to step SA14. In a case where the determination result is No, the process proceeds to step SA06.

[Step SA06] Whether or not the branch circuit which is detected in step SA04 is the head of a subprogram (SP) is determined. In a case where the branch circuit is the head of the subprogram, the process proceeds to step SA07, while in a case where the branch circuit is not the head of the subprogram, the process proceeds to step SA09.

[Step SA07] A branch circuit SP which is detected in step SA04, a last of a subprogram (SPE) which starts from the branch circuit SP, and a subprogram call circuit CALL which calls the branch circuit SP are added to the display object ladder circuit information table.

[Step SA08] The subprogram call circuit CALL which calls the branch circuit SP and is registered in step SA07 is set in the confirmation object ladder circuit information storage region and the process returns to step SA04.

[Step SA09] Whether or not the branch circuit which is detected in step SA04 represents a jump instruction (JUMP) is determined. In a case where the branch circuit represents the jump instruction, the process proceeds to step SA10. In a case where the branch circuit does not represent the jump instruction, the process proceeds to step SA13.

[Step SA10] Whether or not the jump instruction which is detected in step SA04 is a jump instruction instructing jump to the lower direction than the ladder circuit, which has been set in the confirmation object ladder circuit information storage region, in terms of positions in the ladder program is determined. In a case where the jump instruction is the jump instruction instructing jump to the lower direction, the process proceeds to step SA11. In a case where the jump instruction is not the jump instruction instructing jump to the lower direction, the process proceeds to step SA13.

[Step SA11] A branch circuit JUMP which is detected in step SA04 and a branch circuit LABEL which is a jump destination of the branch circuit JUMP are added to the display object ladder circuit information table.

[Step SA12] The branch circuit JUMP which is registered in step SA11 is set in the confirmation object ladder circuit information storage region and the process returns to step SA04.

[Step SA13] The branch circuit which is detected in step SA04 is set in the confirmation object ladder circuit information storage region and the process returns to step SA04.

[Step SA14] The ladder circuit which is registered in the display object ladder circuit information table is displayed on the display screen of the display.

The embodiment of the present invention is described above. However, the present invention is not limited to the example of the above-described embodiment but the present invention can be embodied in various aspects by adding arbitrary alterations.

The invention claimed is:

1. A monitoring device for ladder program, comprising:
   a confirmation object ladder circuit information storage region configured to store information related to a ladder circuit serving as a confirmation object;
   a display object ladder circuit information table configured to store information related to a ladder circuit serving as a display object;
   a processor configured to
   (i) receive, from a user, designation of a ladder circuit serving as the confirmation object in the ladder program and store information related to the ladder circuit which is designated and serves as the confirmation object in the confirmation object ladder circuit information storage region and the display object ladder circuit information table;
   (ii) detect, based on the ladder circuit serving as the confirmation object and stored in the confirmation object ladder circuit information storage region, a branch circuit which is arranged above the ladder circuit serving as the confirmation object in the ladder program and which is closest to the ladder circuit in terms of positions; and (iii) extract a branch circuit serving as a display object from the ladder program to add the branch circuit to the display object ladder circuit information table based on a type of the branch circuit which is the closest in terms of positions, and determine a ladder circuit serving as a next confirmation object to store information related to the ladder circuit serving as the next confirmation object in the confirmation object ladder circuit information storage region based on information related to the branch circuit which is the closest in terms of positions; and a display unit configured to display a ladder circuit serving as the display object and stored in the display object ladder circuit information table; wherein processings (ii) and (iii) are repeated until a first branch circuit which occurs at a first position in the ladder program is set to a confirmation object.

2. The monitoring device for ladder program according to claim 1, wherein
the processor is configured to
(a) in a case where the branch circuit which is the closest in terms of positions is the branch circuit which represents the head of the subprogram,
add (1) a branch circuit which represents a head of a subprogram, (2) a branch circuit which represents a last of the subprogram, and (3) a branch circuit which represents call of the subprogram, to the display object ladder circuit information table, and
store information related to the branch circuit which represents call of the subprogram in the confirmation object ladder circuit information storage region, (b) in a case where the branch circuit which is the closest in terms of positions is the branch circuit which represents the jump instruction and the branch circuit which represents the jump instruction instructs a jump to a lower direction than the ladder circuit being the confirmation object, in terms of positions in the ladder program,
add (1) a branch circuit which represents a jump instruction and (2) a branch circuit which represents a jump destination instructed by the jump instruction, to the display object ladder circuit information table, and
store information related to the branch circuit which represents the jump instruction in the confirmation object ladder circuit information storage region, and (c) in cases other than (a) and (b),
store a branch circuit which is arranged above the ladder circuit stored in the confirmation object ladder circuit information storage region, in terms of positions in the ladder program, and which is the closest in terms of positions in the confirmation object ladder circuit information storage region.

3. The monitoring device for ladder program according to claim 1, wherein the display unit has a display mode for displaying change of a signal of each contact used in the ladder circuit serving as the display object, with respect to time.

* * * * *